(12) United States Patent
Sun et al.

(10) Patent No.: US 11,314,701 B2
(45) Date of Patent: Apr. 26, 2022

(54) RESHARDING METHOD AND SYSTEM FOR A DISTRIBUTED STORAGE SYSTEM

(71) Applicant: XIAMEN WANGSU CO. LTD., Xiamen (CN)

(72) Inventors: Ximei Sun, Xiamen (CN); Xuemin Su, Xiamen (CN)

(73) Assignee: XIAMEN WANGSU CO. LTD., Xiamen (CN)

( * ) Notice: Subject to any disclaimer, the term of this patent is extended or adjusted under 35 U.S.C. 154(b) by 173 days.

(21) Appl. No.: 16/835,034

(22) Filed: Mar. 30, 2020

(65) Prior Publication Data

US 2020/0356537 A1 Nov. 12, 2020

Related U.S. Application Data

(63) Continuation of application No. PCT/CN2019/090319, filed on Jun. 6, 2019.

(30) Foreign Application Priority Data

May 8, 2019 (CN) .......................... 201910379263.0

(51) Int. Cl.
*G06F 16/10* (2019.01)
*G06F 16/18* (2019.01)
(Continued)

(52) U.S. Cl.
CPC ........ *G06F 16/1873* (2019.01); *G06F 16/137* (2019.01); *G06F 16/1734* (2019.01); *G06F 16/182* (2019.01); *G06F 16/278* (2019.01)

(58) Field of Classification Search
None
See application file for complete search history.

(56) References Cited

U.S. PATENT DOCUMENTS 8,392,482 B1 * 3/2013 McAlister ............. G06F 16/278
              707/899
2008/0306990 A1 * 12/2008 Grosman ............. G06F 16/278
(Continued)

FOREIGN PATENT DOCUMENTS

| CN | 102945275 A | 2/2013 |
| CN | 104239417 A | 12/2014 |
| CN | 107368260 A | 11/2017 |

OTHER PUBLICATIONS

Extended European Search Report dated Nov. 12, 2020, Patent Application No. 19828544.7, 9 pages.
(Continued)

*Primary Examiner* — Jau Shya Meng
(74) *Attorney, Agent, or Firm* — USCH Law, PC

(57) ABSTRACT

The present application discloses a resharding method and system for a distributed storage system, and the method comprises: when performing resharding for the bucket, accumulating a statistical value in each of pieces of shard statistical information into a header field; deleting each of pieces of shard statistical information, and creating, according to the number of shards after resharding, several pieces of new shard statistical information, wherein, the number of the pieces of the new shard statistical information is equivalent to the number of shards after resharding, and the several pieces of new shard statistical information have one-to-one correspondence with the shards after resharding; and grouping operation logs in an operation log set according to the number of shards after resharding, such that the number of groups of the operation logs is consistent with the number of shards after resharding.

14 Claims, 4 Drawing Sheets

(51) Int. Cl.
*G06F 16/17* (2019.01)
*G06F 16/27* (2019.01)
*G06F 16/13* (2019.01)
*G06F 16/182* (2019.01)

(56) References Cited

U.S. PATENT DOCUMENTS

| | | | |
|---|---|---|---|
| 2010/0088522 A1* | 4/2010 | Barrus | G06F 21/64 |
| | | | 713/181 |
| 2015/0149508 A1 | 5/2015 | Luo et al. | |
| 2015/0186187 A1 | 7/2015 | Weisberg et al. | |
| 2015/0242451 A1* | 8/2015 | Bensberg | G06F 16/278 |
| | | | 707/615 |
| 2016/0171071 A1* | 6/2016 | Beisiegel | G06F 16/278 |
| | | | 707/715 |
| 2016/0371297 A1 | 12/2016 | Okun et al. | |

OTHER PUBLICATIONS

International Search Report and Written Opinion dated Feb. 6, 2020, Patent Application No. PCT/CN2019/090319, 9 pages.

* cited by examiner

RESHARDING METHOD AND SYSTEM FOR A DISTRIBUTED STORAGE SYSTEM

CROSS-REFERENCE TO RELATED APPLICATIONS

The present disclosure is a continuation of international application No. PCT/CN2019/0903109, filed on Jun. 6, 2019, and titled "RESHARDING METHOD AND SYSTEM FOR A DISTRIBUTED STORAGE SYSTEM", which is incorporated herein by reference in its entirety. This international application claims priority to the Chinese Patent Application No. 201910379263.0, filed on May 8, 2019, entitled "RESHARDING METHOD AND SYSTEM FOR A DISTRIBUTED STORAGE SYSTEM", the disclosure of which is incorporated by reference in its entirety.

TECHNICAL FIELD

The present application relates to the field of Internet technologies, and in particular, to a resharding method and system for a distributed storage system.

BACKGROUND

In current distributed storage systems, metadata of a bucket may be stored in a data structure of bucket index. In a traditional distributed storage system, metadata of a single bucket may all be stored in the same shard file. However, as data of files in the bucket continues to increase, the amount of data in the shard file is also increasing. Excessive volume of shard file may result in a series of problems such as, consumption on performance of underlying storage is large, the process for consistency verification takes a long time, etc.

In view of this, one way to address the above problem currently is to divide the same bucket into a plurality of shards, and store respective parts of the metadata in the plurality of shards respectively. Specifically, as shown in FIG. 1, different shards may be implemented in the existing distributed storage system by using omap (ObjectMap), and the omap may store metadata files. When a user wants to upload a certain target file, the distributed storage system may select a file storage gateway (RGW, Rados GateWay) and determine, by the selected file storage gateway, an omap for storing the metadata of the target file.

However, the existing method for realizing sharding by omap has certain defects when performing resharding, that is, if the number of shards needs to be adjusted, the number of omap should be adjusted correspondingly. Since the metadata of the file is stored in the omap, the distributed storage system has to be set to an offline state when performing resharding. As such, when performing resharding, the original metadata may be migrated and reallocated in the omap after resharding. After the process of resharding is completed, the distributed storage system may be set to the online state to continue to provide services to the user. As the metadata continues to increase, the time consumed by resharding will inevitably increase, thus the distributed storage system will be in the offline state for a long time, and a normal service will not be provided to the user for a long time.

SUMMARY

The purpose of the present application is to provide a resharding method and system for a distributed storage system, which may perform resharding on a bucket in a distributed storage system when the distributed storage system is in an online state.

In order to achieve the above object, on the one hand, the present application provides a resharding method for a distributed storage system, wherein the distributed storage system comprises at least one bucket, the bucket is divided into a preset number of shards and the bucket has a header field for recording statistical information on specified parameter, and each of the shards has a piece of shard statistical information of its own; the method comprising: when performing resharding for the bucket, accumulating a statistical value in each of pieces of shard statistical information into the header field; deleting each of pieces of shard statistical information, and creating, according to a number of shards after resharding, several pieces of new shard statistical information, wherein, the number of the pieces of the new shard statistical information is equivalent to the number of shards after resharding, and the several pieces of new shard statistical information have one-to-one correspondence with the shards after resharding; and grouping operation logs in an operation log set according to the number of shards after resharding, such that the number of groups of the operation logs is consistent with the number of shards after resharding.

In order to achieve the above object, on the other hand, the present application further provides a resharding system for a distributed storage system, wherein the distributed storage system comprises at least one bucket, the bucket is divided into a preset number of shards and the bucket has a header field for recording statistical information on specified parameter, and each of the shards has a piece of shard statistical information of its own; the resharding system comprising: a statistical value accumulating unit configured for accumulating a statistical value in each of pieces of shard statistical information into the header field, when performing resharding for the bucket; a statistical information creating unit configured for deleting each of pieces of shard statistical information, and creating, according to a number of shards after resharding, several pieces of new shard statistical information, wherein, the number of the pieces of the new shard statistical information is equivalent to the number of shards after resharding, and the several pieces of new shard statistical information have an one-to-one correspondence with the shards after resharding; and an operation log grouping unit configured for grouping operation logs in an operation log set according to the number of shards after resharding, such that the number of groups of the operation logs is consistent with the number of shards after resharding.

It can be seen from above that, in the technical solution provided by the present application, the bucket may have its own header field for recording the statistical information on specified parameter, and the plurality of shards divided from the bucket may also have their own shard statistical information. When the bucket needs to be resharded, the statistical value in each of pieces of the shard statistical information may be accumulated into the header field firstly, such that the header field may summarize and record the current statistical value of each of the shards. Then, the current shard statistical information of each of the shards may be deleted, and a plurality of pieces of new shard statistical information is created according to the number of shards after resharding, wherein the number of the pieces of the new shard statistical information is equivalent to the number of shards after resharding. This new shard statistical information may be configured to record the statistical value of each of the shards after resharding. In addition, the operation logs to be processed in the operation log set may be grouped according to the number of shards after resharding, such that the number of groups of the operation logs is consistent with the number of shards after resharding, and each shard after resharding may correspond to a group for its own operation logs.

It can be seen from the above that, the technical solution provided by the present application does not reshard the metadata of the file to be processed, but recreates the shard statistical information and regroups the operation logs. This process of resharding does not need to migrate a large amount of metadata, nor does it affect the online service. Therefore, the resharding method provided by the present application may perform efficient resharding for the bucket in the distributed storage system when the distributed storage system is online.

BRIEF DESCRIPTION OF THE DRAWINGS

To illustrate the technical solutions in embodiments of the present application more clearly, the drawings used in describing the embodiments will be briefly described below. It is obvious that the drawings in the following description only illustrate some embodiments of the present application, and other drawings can be obtained by those skilled in the art according to these drawings without any creative work.

DETAILED DESCRIPTION

To make the objects, technical solutions and advantages of the present application more clear, the embodiments of the present application will be further described in detail below with reference to the accompanying drawings.

Figure 1:
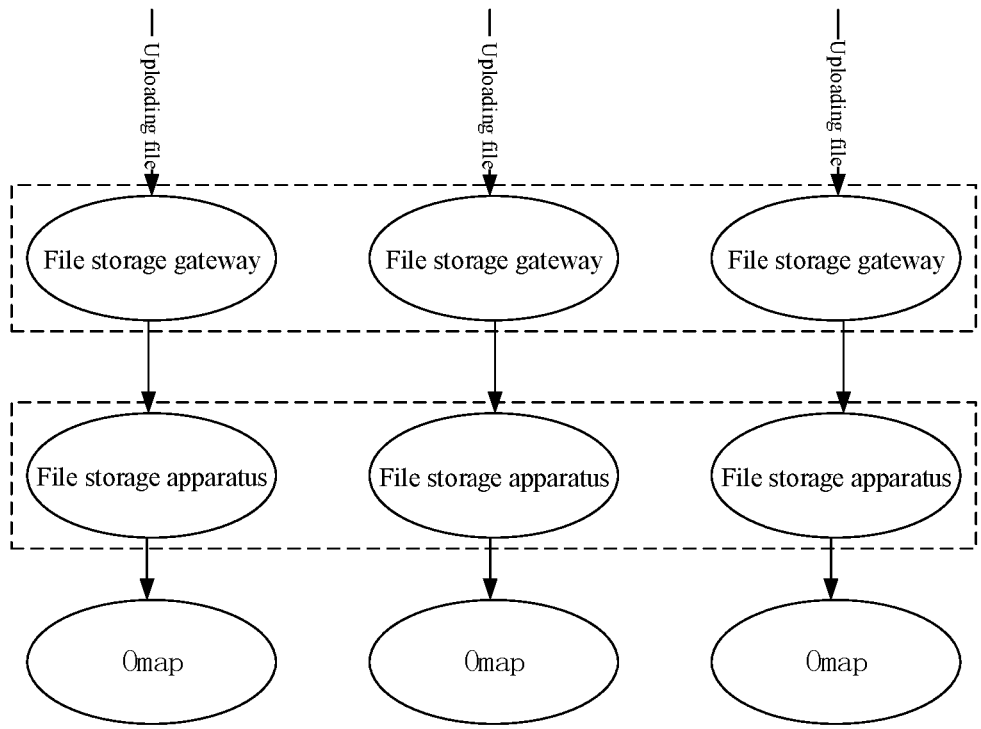
FIG. 1 is a schematic structural diagram of a distributed storage system in the prior art.
Figure 2:
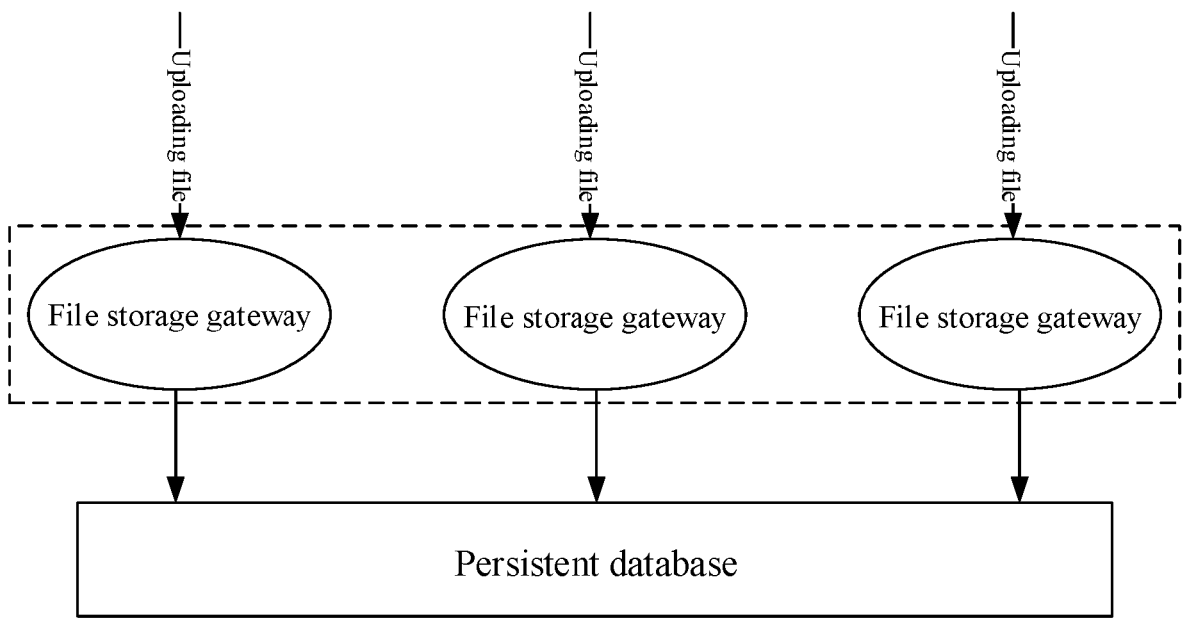
FIG. 2 is a schematic structural diagram of a distributed storage system according to an embodiment of the present application.

The present application provides a resharding method for a distributed storage system. Referring to FIG. 2, metadata of each of files in the distributed storage system may be stored in a persistent database. The persistent database may be, for example, MongoDB. As shown in FIG. 2, the distributed storage system may comprise a plurality of RGWs. When a file needs to be uploaded by a user client, actual data of the file and metadata of the file may be stored in the persistent database through an interface provided by one of the RGWs.

In the distributed storage system, a user may create and manage his own bucket, and the bucket may be divided into a preset number of shards. Various information related to the bucket may be stored in the persistent database as described above. Specifically, the information related to the bucket may comprise: an operation log set, a metadata information set, a header field for recording statistical information on specified parameter, shard statistical information of each of the shards, and the like. The specified parameter may be the number of files and/or data amount occupied by the files. The specified parameter may also be referred to as a total charge value of the bucket. When the user client sends a file processing request to the distributed storage system, the distributed storage system may generate an operation log for the file processing request, and may store the operation log in an operation log set corresponding to the bucket of the user. The metadata information of each of files located within the bucket may be recorded in the metadata information set. The metadata information may comprise various information, such as file size, file modification time, file owner, file tag, and the like. The header field may record a total charge value for the bucket. The total charge value may comprise, for example, a total number of files within the bucket, total data space occupied by the files within the bucket, and the like. The shard statistical information of each of the shards may record a charge value for the shard. For example, the shard statistical information may record the total number of files within the current shard, and the total data space occupied by the files within the current shard.

Figure 3:
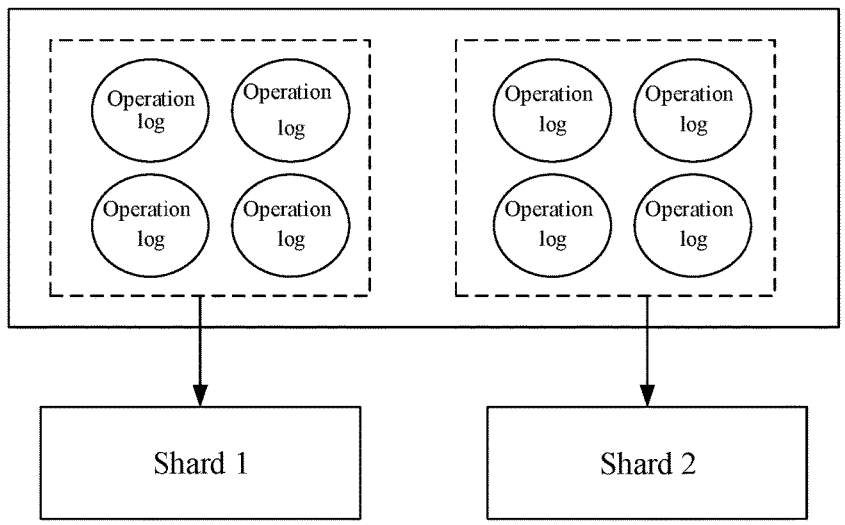
FIG. 3 is a schematic diagram illustrating sharding according to an embodiment of the present application.

Referring to FIG. 3, the operation logs in the operation log set may be grouped according to the current number of the shards. As shown in FIG. 3, assuming that the bucket is currently divided into two shards, and the operation log set of the bucket includes eight operation logs to be processed, then, the eight operation logs to be processed may be divided into two groups, each corresponding to one of the two divided shards respectively.

Figure 4:
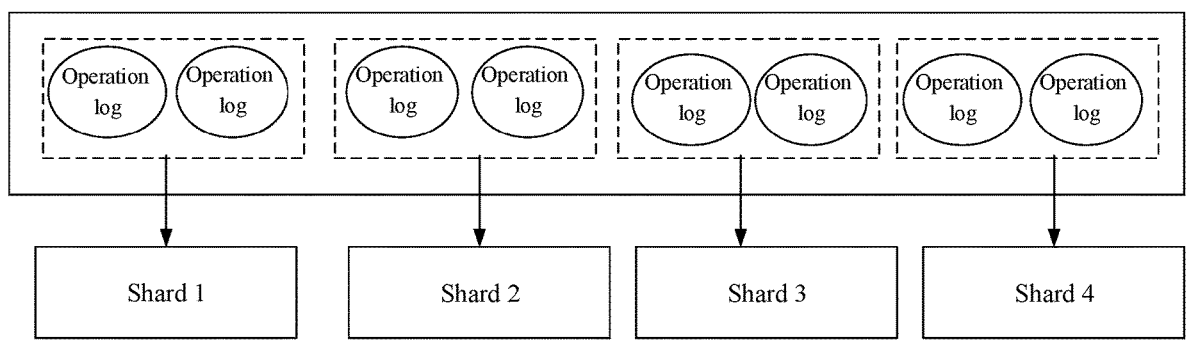
FIG. 4 is a schematic diagram illustrating resharding according to the embodiment of the present application.

If the bucket is resharded, the unprocessed operation logs in the operation log set may be regrouped synchronously. Referring to FIG. 4, the bucket, which is initially divided into two shards, is redivided into four shards, the unprocessed eight operation logs are also divided into four groups accordingly, each corresponding to one of the four shards respectively.

In this embodiment, when the distributed storage system receives from the user client a file processing request directed to a target file, a hash value of the target file may be calculated by using a hash algorithm. Then, when an operation log is generated for the file processing request, the calculated hash value may be written in a specified field of the operation log. The specified field may be, for example, a key_hash field. Thus, the operation log carrying the hash value may be generated, and the operation log carrying the hash value may be written into the operation log set as described above.

Figure 7:
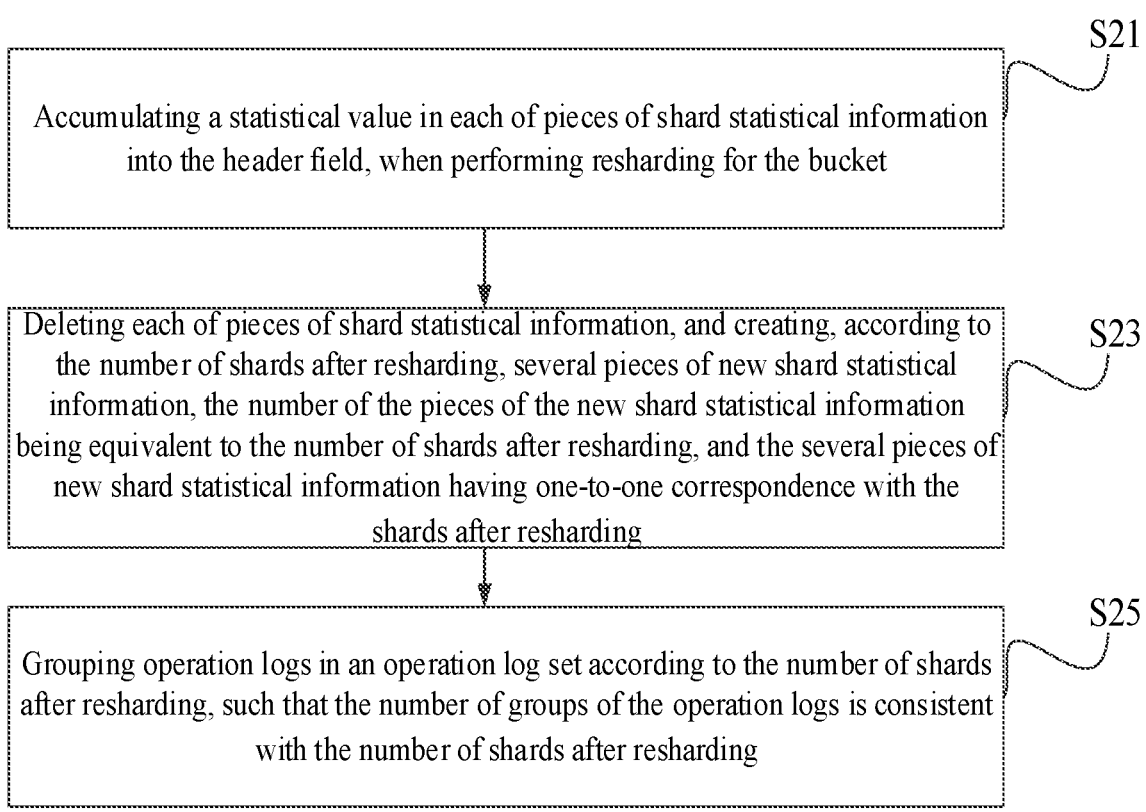
FIG. 7 is a diagram illustrating steps of a resharding method according to the embodiment of the present application.

The present application provides a resharding method applied to the above distributed storage system. The distributed storage system comprises at least one bucket. The bucket may be currently divided into a preset number of shards, and the bucket has a header field for recording statistical information on specified parameter. Each of the shards has a piece of shard statistical information of its own. Referring to FIG. 7, the resharding method may comprise the following steps.

S21: when performing resharding for the bucket, accumulating a statistical value in each of pieces of shard statistical information into the header field.

In this embodiment, when it is needed to perform resharding for the bucket, in order to record a current statistical value of the bucket, the statistical value in each of pieces of the shard statistical information may be accumulated into the header field. It should be noted that when the header field is initially created, an initial statistic value thereof may be 0, and the initial statistic value will not be updated in real time until the resharding is performed. The statistical value recorded in the shard statistical information of each of the shards is updated in real time with the file processing request sent by the user client. That is to say, before the resharding, the header field of the bucket does not reflect the current total statistical value of the bucket, and the total statistical value may be obtained only by summarizing the shard statistical information of each of the shards. The total statistical value of the bucket may be obtained by summing up the statistical values recorded in the shard statistical information of all the shards in the bucket.

Therefore, when performing resharding, the statistical value recorded in the shard statistical information of each of the shards is needed to be accumulated into the header field of the bucket, thereby the current total statistical value of the bucket may be represented by the header field.

S23: deleting each of pieces of shard statistical information, and creating, according to the number of shards after resharding, several pieces of new shard statistical information, wherein, the number of the pieces of the new shard statistical information is equivalent to the number of shards after resharding, and the several pieces of new shard statistical information have an one-to-one correspondence with the shards after resharding.

In this embodiment, after updating the current total statistical value of the bucket into the header field, each of pieces of shard statistical information may be deleted, and several pieces of new shard statistical information may be created according to the number of shards after resharding, wherein, the number of the pieces of the new shard statistical information is equivalent to the number of shards after resharding. For example, the bucket is originally divided into two shards; and after resharding, the bucket is divided into four shards. In this case, the shard statistical information of the original two shards needs to be deleted, and four pieces of new shard statistical information are created. An initial statistical value in the created new shard statistical information may be zero. Thus, the several pieces of the created new shard statistical information may have one-to-one correspondence with the shards after resharding, so as to record a subsequent statistical value of each of the shards.

S25: grouping operation logs in an operation log set according to the number of shards after resharding, such that the number of groups of the operation logs is consistent with the number of shards after resharding.

In this embodiment, after the shard statistical information is recreated, the operation logs in the operation log set may be grouped according to the number of shards after resharding. For example, the operation logs in the operation log set are originally divided into two groups, and after the bucket is redivided into four shards, the operation logs in the operation log set should also be divided into four groups, such that the number of groups of the operation log is consistent with the number of shards after resharding.

In an embodiment, the header field of the bucket may further comprise a current version number of the bucket. Specifically, at the beginning of creating the bucket, the version number may be zero, and each time the bucket is resharded in the subsequent processes, the version number may be accumulated by one. In this way, when performing resharding for the bucket, the current version number of the bucket may be identified from the header field of the bucket, the current version number may be updated after the statistical value in each of pieces of the shard statistical information is accumulated into the header field, and the current version number in the header field is replaced with the updated version number. According to the above updating method, the current version number may be incremented by one, so that a new version number is generated.

In this embodiment, after identifying the current version number of the bucket from the header field of the bucket, the header field of the bucket may be stored in association with the current version number in a backup data set, and each of pieces of the shard statistical information for the preset number of shards may be stored in association with the current version number in the backup data set. The data in the backup data set may be used for data restoration. Specifically, if the resharding is failed due to an abnormality occurred during performing the resharding, the data restoration may be performed on the bucket based on the header field and each of pieces of the shard statistical information stored in the backup data set and associated with the current version number. In this way, the header field and the shard statistical information of each of the shards may be restored to a state before resharding, thereby improving the stability of the distributed storage system.

Figure 5:
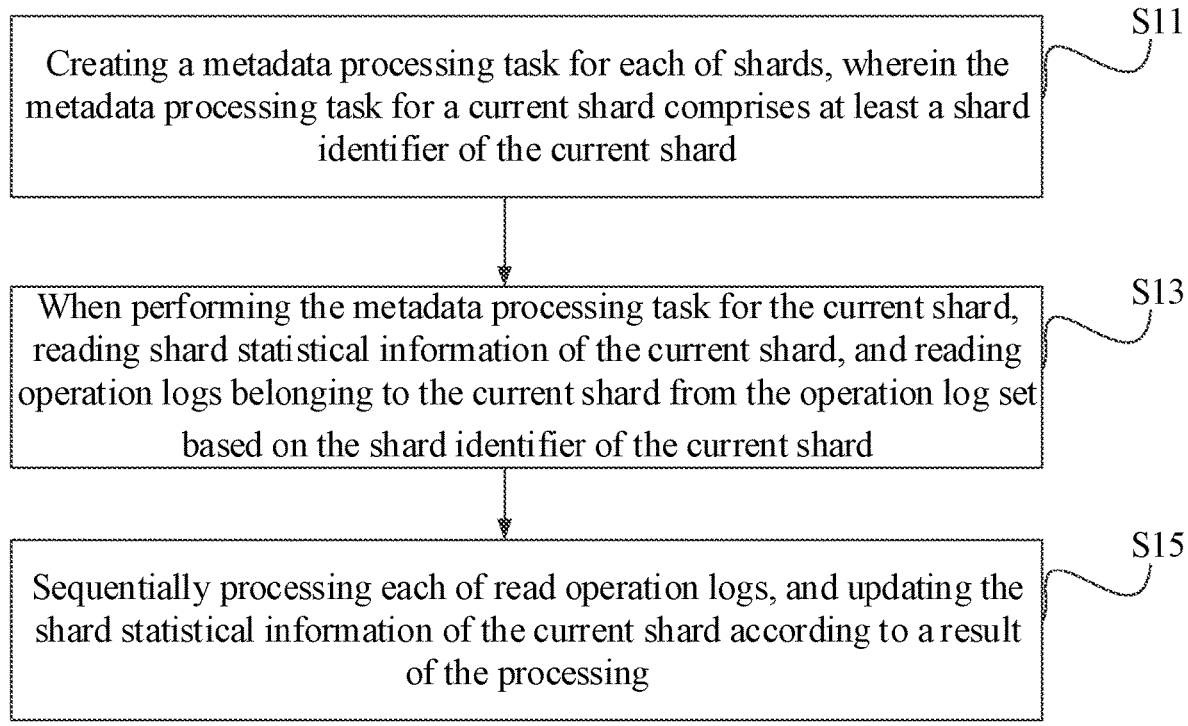
FIG. 5 is a diagram illustrating steps of a data processing method according to an embodiment of the present application.

Referring to FIG. 5, the present application further provides a data processing method for a distributed storage system, and it may comprise the following steps.

S11: creating a metadata processing task for each of the shards, wherein the metadata processing task for a current shard comprises at least a shard identifier of the current shard.

In this embodiment, a scheduling thread in charge of processing an operation log may create a metadata processing task for each of the shards divided from the bucket. Description information of the bucket may be carried in each of the created metadata processing tasks. The description information may comprise, for example, a creator of the bucket, creation time of the bucket, and the like. In addition, the shard identifier of the current shard may also be carried in the metadata processing task for the current shard. In this way, different metadata processing tasks may be distinguished by shard identifiers.

In this embodiment, the shard identifier may be a serial number of a shard. In one application example, the serial number of the shard may be gradually incremented from zero. For example, a shard identifier of a first shard may be 0, a shard identifier of a second shard may be 1, and so on. Of course, the form of the shard identifiers may be varied according to actual application scenarios, which is not limited in this application.

S13: when performing the metadata processing task for the current shard, reading shard statistical information of the current shard, and reading operation logs belonging to the current shard from the operation log set based on the shard identifier of the current shard.

In this embodiment, each shard of the bucket may have its own worker thread, and the worker thread may receive and execute the metadata processing task for the current shard. Specifically, the plurality of shards may be processed by a plurality of worker threads. Assuming that there are 1-20 shards, and the number of the configured worker threads is 40, in this case, 20 worker threads may be executed simultaneously and concurrently, and the other 20 worker threads will be in idle. Thus, the metadata processing tasks for respective shards are executed at the same time by respective worker threads, each of which is unique for the corresponding shard. When the metadata processing task for the current shard is performed, firstly, shard statistical information to which the shard identifier of the current shard is directed is queried from a shard statistical information set according to the shard identifier carried in the metadata processing task, and then the shard statistical information obtained after the query is taken as the shard statistical information of the current shard. Thus, the worker thread may read the shard statistical information of the current shard. In addition, the worker thread may also select an operation log belonging to the current shard from the operation log set according to the shard identifier of the current shard. Each operation log in the operation log set may carry the calculated hash value, and the worker thread may determine whether a current operation log belongs to the current shard according to the hash value. Specifically, the worker thread may traverse all the operation logs in the operation log set, and identify a hash value filled in a specified field of a current operation log. Then, a mod operation may be performed on the identified hash value with respect to the preset number. If the shard identifiers are numbered starting from 0, the result of the mod operation may only correspond to one of the plurality of shard identifiers. Then, if the result of the mod operation matches with the shard identifier of the current shard, the current operation log may be taken as the operation log belonging to the current shard. Whereas, if the result of the mod operation does not match with the shard identifier of the current shard, it represents that the current operation log does not belong to the current shard.

In the present application, the grouping of the operation logs in the above step S25 may also be implemented by performing a mod operation on the hash value carried in the operation log with respect to the number of shards after resharding, as described in step S13, and grouping the operation logs having the same result of mod operation into the same group, thereby generating a plurality of operation log groups, wherein, the number of the operation log groups is equivalent to the number of shards after resharding.

S15: sequentially processing each of the read operation logs, and updating the shard statistical information of the current shard according to a result of the processing.

In this embodiment, in the foregoing manner, the worker thread may select all the operation logs belonging to the current shard from the operation log set, and may process each of the operation logs sequentially according to the generation time of the operation logs.

Specifically, when an operation log is processed, metadata information of a target file to be processed may be extracted from the current operation log being read, and the metadata information may represent metadata information of the target file after being processed by the current operation log. In this way, after the metadata information of the target file is extracted, the extracted metadata information may be written into the metadata information set of the bucket.

In addition, the shard statistical information of the current shard may be processed differently according to the type of the current operation log. Specifically, if the current operation log is an upload operation log for uploading a new file, a statistical value for specified parameter of the new file may be identified in the current operation log, and the identified statistical value for specified parameter may be accumulated into the shard statistical information of the current shard. The shard statistical information of the current shard may be recorded with total statistical value for specified parameter of respective files in the current shard. Therefore, when a new file needs to be written into the current shard, the statistical value for specified parameter of the new file needs to be accumulated into the shard statistical information. Similarly, if the read current operation log is a modification operation log for modifying a stored file, the statistical value for specified parameter of the stored file after being modified may be identified in the current operation log, and the current statistical value for specified parameter of the stored file, in the shard statistical information of the current shard, may be modified to the identified statistical value for specified parameter after the stored file is modified. In addition, if the read current operation log is a deletion operation log for deleting a stored file, the statistical value for specified parameter of the stored file to be deleted may be identified in the current operation log, and the identified statistical value for specified parameter may be deducted from the shard statistical information of the current shard. The above statistical value for specified parameter may refer to data amount of the file in practical applications.

In this embodiment, the shard statistical information of the current shard may also comprise a total number of files within the current shard. Therefore, if the read current operation log is an upload operation log for uploading a new file, the number of files in the shard statistical information of the current shard may be increased. Specifically, if the number of new files for uploading is one, the number of files in the shard statistical information may be incremented by one. If the read current operation log is a modification operation log for modifying a stored file, the number of files in the shard statistical information of the current shard may be kept unchanged. If the read current operation log is a deletion operation log for deleting a stored file, the number of files in the shard statistical information of the current shard may be reduced. Specifically, if the number of deleted stored files is one, the number of files in the shard statistical information may be decreased by one.

Thus, after the worker thread processes all the operation logs belonging to the current shard one by one, the shard statistical information of the current shard may be updated synchronously. Finally, the worker thread may write the updated shard statistical information into the shard statistical information set to replace the shard statistical information of the current shard stored before updating. At this point, the worker thread completes the metadata processing task for the current shard. At this time, the worker thread may notify the above scheduling thread that the current metadata processing task has been completed, and wait to receive the next metadata processing task for the current shard.

In the present application, after step S25, a metadata processing task may be created for each of the shards after resharding and after performing the metadata processing tasks, each of the operation logs in the operation log set is processed to update the shard statistical information of each of the shards, according to the method described in steps S11 to S15.

Figure 6:
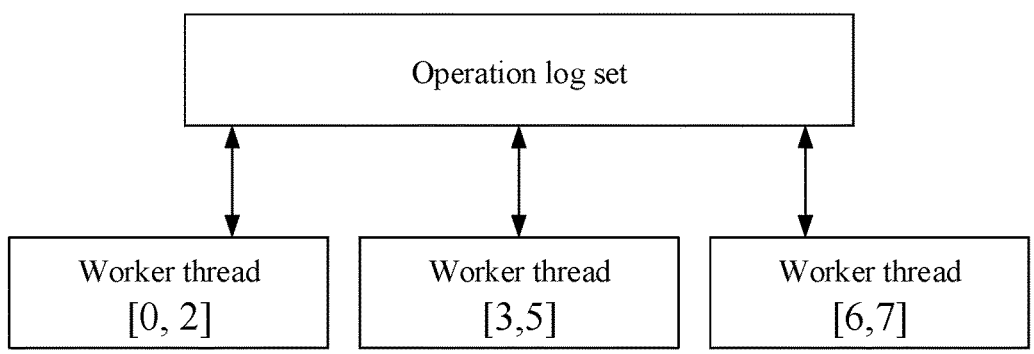
FIG. 6 is a schematic diagram illustrating a shard interval according to an embodiment of the present application.

In an embodiment, the worker thread described above may also process metadata processing tasks for a plurality of shards within a shard interval. Thus, each worker thread may have a shard interval of its own, and each worker thread may execute metadata processing tasks within the shard interval of its own. Specifically, the shards of the bucket may be further divided into a plurality of shard intervals, and each of the shard intervals may be defined by a starting shard identifier and an ending shard identifier. For example, the bucket is currently divided into 8 shards, and the 8 shards may be further divided into 3 shard intervals, the three shard sections may be expressed as [0, 2], [3, 5], [6, 7]. Thus, the metadata processing tasks of the 8 shards may be processed through three worker threads, finally. Referring to FIG. 6, the operation logs in the operation log set may be executed by the three worker threads finally.

In practical applications, the range of the shard interval may be flexibly set. For example, when the processing performance of the system is insufficient, the range of the shard interval may be appropriately narrowed, such that the metadata processing tasks to be performed by each of the worker threads are not excessive. When the processing performance of the system is sufficient, the range of the shard interval may be appropriately enlarged, such that the metadata processing tasks to be performed by each of the worker threads are increased.

The present application further provides a resharding system for a distributed storage system, wherein the distributed storage system comprises at least one bucket, the bucket is divided into a preset number of shards and the bucket has a header field for recording statistical information on specified parameter, and each of the shards has a piece of shard statistical information of its own. The resharding system comprises:

a statistical value accumulating unit configured for accumulating a statistical value in each of pieces of shard statistical information into the header field, when performing resharding for the bucket;

a statistical information creating unit configured for deleting each of pieces of shard statistical information, and creating, according to the number of shards after resharding, several pieces of new shard statistical information, wherein, the number of the pieces of the new shard statistical information is equivalent to the number of shards after resharding, and the several pieces of new shard statistical information have an one-to-one correspondence with the shards after resharding; and an operation log grouping unit configured for grouping operation logs in an operation log set according to the number of shards after resharding, such that the number of groups of the operation logs is consistent with the number of shards after resharding.

In an embodiment, the header field of the bucket comprises a current version number of the bucket; correspondingly, the system further comprises:

a unit for identifying current version number configured for identifying the current version number of the bucket from the header field of the bucket; and a unit for updating version number configured for updating the current version number after the statistical value in each of pieces of the shard statistical information is accumulated into the header field, and replacing the current version number in the header field with the updated version number.

In an embodiment, the system further comprises:

a backup storage unit configured for storing the header field of the bucket in association with the current version number in a backup data set, and storing each of pieces of the shard statistical information for the preset number of shards in association with the current version number in the backup data set; and a restoring unit configured for performing data restoring for the bucket based on the header field and each of pieces of the shard statistical information stored in the backup data set and associated with the current version number, if the resharding is failed due to an abnormality occurred when performing the resharding.

In an embodiment, the system further comprises:

a task creating unit configured for creating a metadata processing task for each of the shards, wherein the metadata processing task for a current shard comprises at least a shard identifier of the current shard;

a task executing unit configured for reading shard statistical information of the current shard, and reading operation logs belonging to the current shard from the operation log set based on the shard identifier of the current shard, when performing the metadata processing task for the current shard; and a log processing unit configured for sequentially processing each of the read operation logs, and updating the shard statistical information of the current shard according to a result of the processing.

It can be seen from above that, in the technical solution provided by the present application, the bucket may have its own header field, and the plurality of shards divided from the bucket may also have their own shard statistical information. When the bucket needs to be resharded, the statistical value in each of pieces of the shard statistical information may be accumulated into the header field firstly, such that the header field may summarize and record the current statistical value of each of the shards. Then, the current shard statistical information of the each of the shards may be deleted, and a plurality of pieces of new shard statistical information is created according to the number of shards after resharding, wherein the number of the pieces of the new shard statistical information is equivalent to the number of shards after resharding. This new shard statistical information may be configured to record the statistical value of each of the shards after resharding. In addition, the operation logs to be processed in the operation log set may be grouped according to the number of shards after resharding, such that the number of groups of the operation logs is consistent with the number of shards after resharding, and each shard after resharding may correspond to a group for its own operation logs.

Since the sharding method of the present application is different from the traditional sharding method, when metadata of the shards is processed, the metadata processing tasks may be created for respective shards respectively, and then, when the metadata processing task of the current shard is performed, the shard statistic information of the current shard may be read, and the operation logs belonging to the current shard may be read from the operation log set. Finally, respective read operation logs may be processed sequentially, and the shard statistical information of the current shard may be updated according to a result of the processing, thereby the process of updating the metadata of the shard is completed.

It can be seen from the above that, the technical solution provided by the present application does not reshard the metadata of the file to be processed, but recreates the shard statistical information and regroups the operation logs. This process of resharding does not need to migrate a large amount of metadata, nor does it affect the online service. Therefore, the resharding method provided by the present application may perform efficient resharding for the bucket in the distributed storage system when the distributed storage system is online. In addition, the operation logs after resharding may be processed in parallel through more or fewer processes, thereby implementing a dynamic adjustment process for parallel processing.

Through the description of the above embodiments, those skilled in the art may clearly understand that the embodiments may be implemented by means of software plus a necessary general hardware platform, and of course, they may also be implemented by hardware. Based on such understanding, the above-described technical solutions in essence may be embodied in the form of software products or the part contributing to the prior art may be embodied in the form of software products, and the software products may be stored in a computer readable storage medium such as ROM/RAM, magnetic Discs, optical discs, etc., and may include several instructions enabling a computer apparatus (which may be a personal computer, server, or network apparatus, etc.) to perform the methods described in various embodiments or in some portions of the embodiments.

The above description only illustrates the preferred embodiments of the present application, but it is not intended to limit the present application. Any modifications, equivalent substitutions, improvements, etc., within the spirit and principles of the present application, should fall within the scope of protection of the present application.

What is claimed is:

1. A resharding method for a distributed storage system, wherein the distributed storage system comprises at least one bucket, each of the at least one bucket is divided into a preset number of shards and has a header field for recording statistical information on at least one specified parameter, and each of the preset number of shards has a corresponding piece of shard statistical information; the method comprising:

performing resharding for a respective bucket of the at least one bucket, including:

accumulating a statistical value in the piece of shard statistical information corresponding to each respective shard of the preset number of shards in the respective bucket before resharding, and writing an accumulated result into the header field of the respective bucket;

deleting pieces of shard statistical information respectively corresponding to the preset number of shards before resharding, creating, according to a number of new shards after resharding, several pieces of new shard statistical information, wherein, a number of the several pieces of the new shard statistical information is equal to the number of new shards after resharding, and the several pieces of new shard statistical information have one-to-one correspondence with the new shards after resharding; and grouping operation logs in an operation log set according to the number of new shards after resharding, such that a number of groups of the operation logs is consistent with the number of new shards after resharding;

wherein the header field of the respective bucket further comprises a current version number of the respective bucket; and wherein the method further comprises:

identifying the current version number of the respective bucket from the header field of the respective bucket;

storing the header field of the respective bucket in association with the current version number in a backup data set, and storing the piece of shard statistical information corresponding to each shard of the preset number of shards in association with the current version number in the backup data set;

updating the current version number after the accumulated result corresponding to each respective shard of the preset number of shards is written into the header field, and replacing the current version number in the header field with the updated version number; and in response to resharding having failed due to an abnormality occurred during performing resharding, performing data restoration for the respective bucket based on the header field and each piece of shard statistical information stored in the backup data set and associated with the current version number.

2. The method according to claim 1, wherein the method further comprises performing the following steps after grouping the operation logs in the operation log set:

creating a metadata processing task for each of the new shards after resharding, wherein the metadata processing task for a current shard comprises at least a shard identifier of the current shard;

in response to performing the metadata processing task for the current shard, reading shard statistical information of the current shard, and reading operation logs belonging to the current shard from the operation log set based on the shard identifier of the current shard; and sequentially processing each of the operation logs that have been read out from the operation log set based on the shard identifier of the current shard, and updating the shard statistical information of the current shard according to a result of the processing.

3. The method according to claim 2, wherein an operation log in the operation log set is generated in the following manner:

receiving a file processing request directed to a target file, and calculating a hash value of the target file; and generating an operation log corresponding to the file processing request, and writing the calculated hash value into a specified field of the operation log.

4. The method according to claim 2, wherein, the reading operation logs belonging to the current shard from the operation log set based on the shard identifier of the current shard comprises:

traversing all the operation logs in the operation log set, and identifying a hash value filled in a specified field of the current operation log; and performing a mod operation on the identified hash value with respect to the preset number, and in response to a result of the mod operation matching with the shard identifier of the current shard, taking the current operation log as an operation log belonging to the current shard.

5. The method according to claim 2, wherein the reading the shard statistical information of the current shard comprises:

querying, from a shard statistical information set, shard statistical information to which the shard identifier of the current shard is directed, and taking the shard statistical information obtained after the querying as the shard statistical information of the current shard.

6. The method according to claim 2, wherein the updating the shard statistical information of the current shard according to a result of the processing comprises:

in response to a read current operation log being an upload operation log for uploading a new file, identifying, in the current operation log, a statistical value for specified parameter of the new file, and accumulating the identified statistical value for specified parameter into the shard statistical information of the current shard;

in response to the read current operation log being a modification operation log for modifying a stored file, identifying, in the current operation log, a statistical value for specified parameter of the stored file after being modified, and modifying a current statistical value for specified parameter of the stored file in the shard statistical information of the current shard to the identified statistical value for specified parameter of the stored file after being modified; and in response to the read current operation log being a deletion operation log for deleting a stored file, identifying, in the current operation log, a statistical value for specified parameter of the stored file to be deleted, and deducting the identified statistical value for specified parameter from the shard statistical information of the current shard.

7. The method according to claim 2, wherein the updating the shard statistical information of the current shard according to a result of the processing further comprises:
in response to the read current operation log being an upload operation log for uploading a new file, increasing the number of files in the shard statistical information of the current shard;
in response to the read current operation log being a modification operation log for modifying a stored file, keeping the number of files in the shard statistical information of the current shard unchanged; and
in response to the read current operation log being a deletion operation log for deleting a stored file, reducing the number of files in the shard statistical information of the current shard.

8. The method according to claim 2, wherein the sequentially processing each of operation logs that have been read out from the operation log set based on the shard identifier of the current shard comprises:
extracting, from a read current operation log, metadata information of a target file to be processed, and writing the extracted metadata information into a metadata information set of the bucket.

9. The method according to claim 2, wherein the metadata processing tasks for respective shards are executed by a plurality of worker threads; wherein, the metadata processing tasks for respective shards are executed by worker threads of their own at the same time.

10. A resharding system for a distributed storage system, wherein the distributed storage system comprises at least one bucket, each of the at least one bucket is divided into a preset number of shards and has a header field for recording statistical information on a specified parameter, and each of the preset number of shards has a corresponding piece of shard statistical information; the resharding system comprising:
a statistical value accumulating unit configured for accumulating a statistical value in the piece of shard statistical information corresponding to each respective shard of the preset number of shards in a respective bucket before resharding, and writing an accumulated result into the header field of the respective bucket;
a statistical information creating unit configured for deleting each of pieces of shard statistical information respectively corresponding to the preset number of shards before resharding, and creating, according to a number of new shards after resharding, several pieces of new shard statistical information, wherein, a number of the several pieces of the new shard statistical information is equal to the number of new shards after resharding, and the several pieces of new shard statistical information have an one-to-one correspondence with the new shards after resharding; and
an operation log grouping unit configured for grouping operation logs in an operation log set according to the number of new shards after resharding, such that a number of groups of the operation logs is consistent with the number of new shards after resharding;
wherein the header field of the respective bucket comprises a current version number of the respective bucket;
the system further comprises:
a unit for identifying current version number configured for identifying the current version number of the respective bucket from the header field of the respective bucket; and
a unit for updating version number configured for updating the current version number after the accumulated result corresponding to each respective shard of the preset number of shards is written into the header field, and replacing the current version number in the header field with the updated version number;
a backup storage unit configured for storing the header field of the respective bucket in association with the current version number in a backup data set, and storing the piece of shard statistical information corresponding to each shard of the preset number of shards in association with the current version number in the backup data set; and
a restoring unit configured for performing data restoration for the respective bucket based on the header field and each piece of shard statistical information stored in the backup data set and associated with the current version number, in response to resharding having failed due to an abnormality occurred during performing resharding.

11. The system according to claim 10, wherein the system further comprises:
a task creating unit configured for creating a metadata processing task for each of the new shards after resharding, wherein the metadata processing task for a current shard comprises at least a shard identifier of the current shard;
a task executing unit configured for reading shard statistical information of the current shard, and reading operation logs belonging to the current shard from the operation log set based on the shard identifier of the current shard, in response to performing the metadata processing task for the current shard; and
a log processing unit configured for sequentially processing each of the operation logs that have been read out from the operation log set based on the shard identifier of the current shard, and updating the shard statistical information of the current shard according to a result of the processing.

12. A resharding apparatus for a distributed storage system, wherein the distributed storage system comprises at least one bucket, each of the at least one bucket is divided into a preset number of shards and has a header field for recording statistical information on a specified parameter, and each of the preset number of shards has a corresponding piece of shard statistical information; the resharding apparatus comprising at least one processor and a memory communicatively coupled to the at least one processor,
wherein, the memory stores instructions executable by the at least one processor, and the instructions are executed by the at least one processor to enable the at least one processor to implement a resharding method for the distributed storage system, comprising:
performing resharding for a respective bucket of the at least one bucket, including:
accumulating a statistical value in the piece of shard statistical information corresponding to each respective shard of the preset number of shards in the respective bucket before resharding, and writing an accumulated result into the header field of the respective bucket;
deleting pieces of shard statistical information respectively corresponding to the preset number of shards before resharding, creating, according to a number of new shards after resharding, several pieces of new shard statistical information, wherein, a number of the several pieces of the new shard statistical information is equal to the number of new shards after resharding, and the several pieces of new shard statistical information have one-to-one correspondence with the new shards after resharding; and grouping operation logs in an operation log set according to the number of new shards after resharding, such that a number of groups of the operation logs is consistent with the number of new shards after resharding;

wherein the header field of the respective bucket comprises a current version number of the respective bucket;

the at least one processor further implement:

identifying the current version number of the respective bucket from the header field of the respective bucket;

storing the header field of the respective bucket in association with the current version number in a backup data set, and storing the piece of shard statistical information corresponding to each shard of the preset number of shards in association with the current version number in the backup data set;

updating the current version number after the accumulated result corresponding to each respective shard of the preset number of shards is written into the header field, and replacing the current version number in the header field with the updated version number; and in response to resharding having failed due to an abnormality occurred during performing resharding, performing data restoration for the respective bucket based on the header field and each piece of shard statistical information stored in the backup data set and associated with the current version number.

13. The resharding apparatus according to claim 12, the at least one processor further implement the following steps after grouping the operation logs in the operation log set:

creating a metadata processing task for each of the new shards after resharding, wherein the metadata processing task for a current shard comprises at least a shard identifier of the current shard;

in response to performing the metadata processing task for the current shard, reading shard statistical information of the current shard, and reading operation logs belonging to the current shard from the operation log set based on the shard identifier of the current shard; and sequentially processing each of the operation logs that have been read out from the operation log set based on the shard identifier of the current shard, and updating the shard statistical information of the current shard according to a result of the processing.

14. The resharding apparatus according to claim 13, wherein an operation log in the operation log set is generated in the following manner:

receiving a file processing request directed to a target file, and calculating a hash value of the target file; and generating an operation log corresponding to the file processing request, and writing the calculated hash value into a specified field of the operation log.

* * * * *